United States Patent Office 3,344,429
Patented Sept. 26, 1967

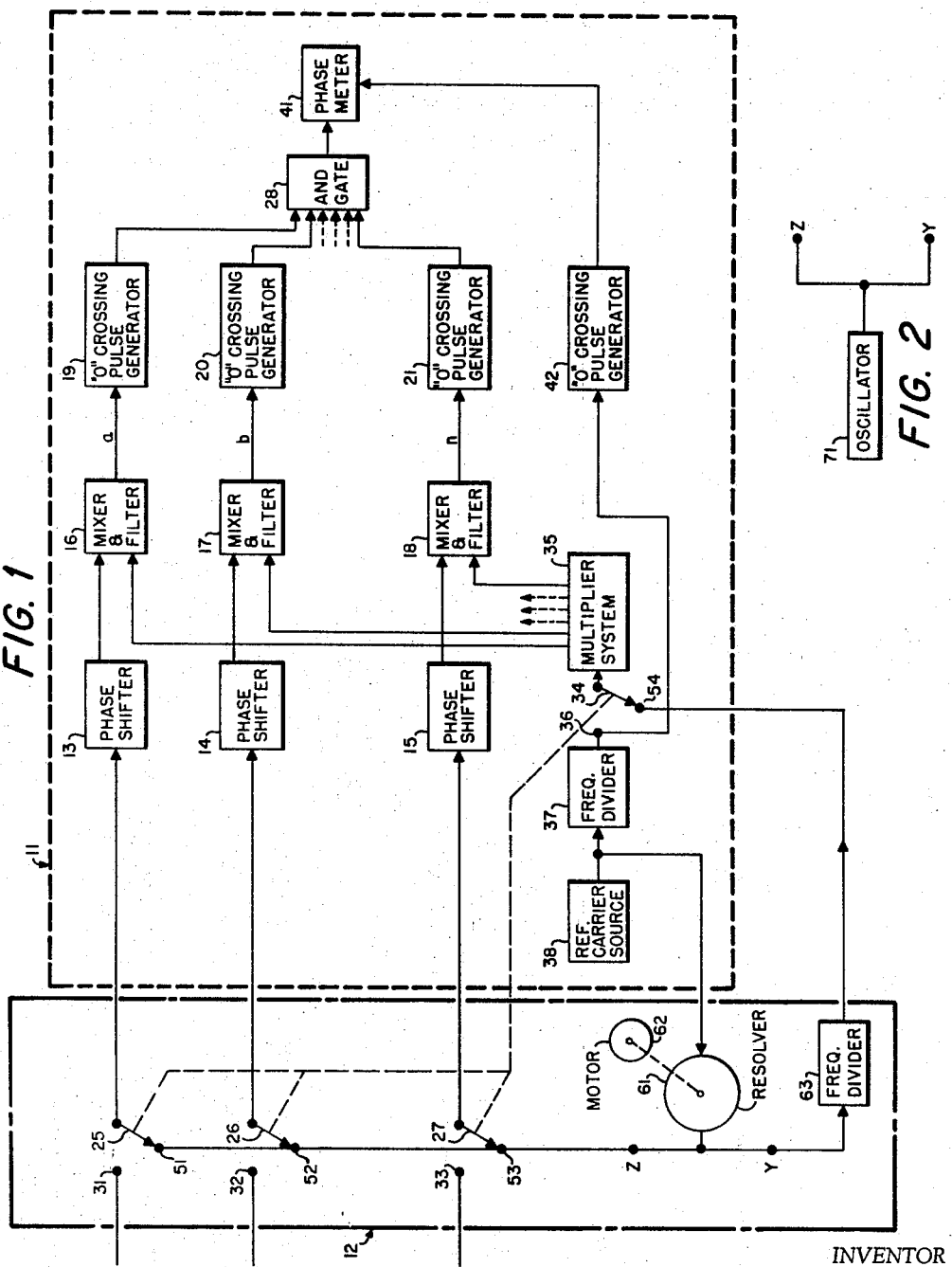
Sept. 26, 1967     H. B. GARDNER     3,344,429
SIGNAL SIMULATOR FOR PHASE CHANNEL COMBINERS
Filed Dec. 30, 1965
INVENTOR
HUGH B. GARDNER
BY
ATTORNEY

3,344,429
SIGNAL SIMULATOR FOR PHASE CHANNEL COMBINERS
Hugh B. Gardner, Forest Heights, Md., assignor to the United States of America as represented by the Secretary of the Navy
Filed Dec. 30, 1965, Ser. No. 517,864
7 Claims. (Cl. 343—113)

ABSTRACT OF THE DISCLOSURE

A signal simulator for testing a channel combiner in a multi-baseline radio interferometer system. A motor-driven resolver and a frequency divider are used to produce coherent signals similar to signals produced when a satellite passes through the interferometer detection zone.

---

The present invention relates to a signal simulator and, more particularly, to a signal simulator for a phase channel combiner such as used with multi-baseline radio interferometers to automatically resolve the angular direction cosine of a target in space.

A typical phase channel combiner of the aforementioned character is disclosed in Patent No. 3,217,326, entitled Space Surveillance System With Instantaneous Resolution of Multiple Cycle Phase Ambiguity, issued Nov. 9, 1965, to M. G. Kaufman and Donald W. Lynch. In order to test the performance of such a phase channel combiner, some means of continuously and coherently varying the phase of many signals so as to simulate actual operating conditions is required.

Heretofore, actual operating conditions of a phase channel combiner have been simulated through the use of a mechanical phase resolver for each of the several combiner channels with each of the resolvers geared with appropriate ratios to a common motor driven shaft. This arrangement is feasible where the combiner has only a few channels but, where the combiner has a greater number of channels so as to provide greater resolution, this prior art simulator is not feasible because its bulk and cost become prohibitive. Furthermore, even where the combiner has only a few channels, the prior art simulator is not as satisfactory as the simulator of the instant invention since it has a greater susceptibility to failure, less flexibility as to the direction and rate of the simulated target pass, and, despite these disadvantages, greater bulk and cost.

The general purpose of this invention is to provide a simulator for a phase channel combiner which embraces all the advantages of similarly employed prior art simulators and possesses none of the aforedescribed disadvantages. To attain this, the present invention contemplates: disconnecting the combiner inputs and the combiner multiplier system input from their respective operational inputs and connecting the combiner inputs and the combiner multiplier system input to a signal providing device which provides a signal which causes the phase of the output signals from each of the phase carrier frequency converters in each of the combiner channels to vary continuously and coherently with respect to the phase of the output signals from each of the other phase carrier frequency converters so as to simulate a target pass.

An object of the present invention is the provision of a relatively compact, inexpensive, and reliable signal simulator for a phase channel combiner.

Another object is to provide a simulator for a phase channel combiner wherein the simulator has flexibility as to the direction and rate of the simulated satellite pass.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a block diagram of the combination of a signal simulator having an electro-mechanical signal producing device with a phase channel combiner;

FIG. 2 illustrates an electronic alternative to the electro-mechanical device of FIG. 1.

Turning now to FIG. 1 wherein a $n$-channel phase channel combiner 11 is illustrated in combination with one embodiment of a simulator 12, it should be noted that only those details of combiner 11 which are necessary to an understanding of the present invention are shown and that a more complete showing of a combiner suitable for use with the instant invention can be found in the aforementioned Patent No. 3,217,326.

Each of channels $a$–$n$ contains a phase shifter 13–15 respectively; a mixer and filter 16–18 respectively; and a "0" crossing pulse generator 19–21 respectively.

The input to each of channels $a$–$n$ is shown as being connected to a respective one of blades 25–27 of a $n$-pole, double throw mechanical switch, though it should be understood that a relay operated or electronic switch could also be used. The output from each of channels $a$–$n$ is connected to a respective input of "AND" gate 28.

When combiner 11 is in an operational status, blades 25–27 are rsepectively maintained in contact with terminals 31–33 which, in turn, are connected to outputs of respective interferometers (not shown) with the baselines of the several interferometers varying in length from that necessary to obtain an unambiguous indication of the target position (i.e., a baseline equal to less than $\lambda/2$ where $\lambda=$the wavelength of the signal received by the interferometers) to that necessary to obtain the desired target position resolution. Also, under such conditions, blade 34 of the single pole, double throw switch, which is connected to the input of multiplier system 35, is maintained in contact with terminal 36 which, in turn, is connected through an appropriate frequency divider 37 to the output of a reference carrier source 38 which supplies a signal having a reference frequency $\omega_r$.

The several interferometers supply phase coherent signals at a reference carrier frequency $\omega_r$. Target position information is carried by the phase of the signals and, hence, these phases vary continuously and coherently during a horizon-to-horizon target pass.

The operation of simulator 12 can be understood through an analysis of combiner 11 when combiner 11 is in operational status. Taking the $j$th channel of combiner 11 as being typical and ignoring amplitude (as is done throughout the following since amplitude has no material bearing on the operation of combiner 11 or simulator 12) the input signal to the phase shifter in the $j$th channel can be described as:

$$E_{sj} = \sin(\omega_r t + A\phi_{sj}) \qquad (1)$$

with $$\phi_{sj} = \frac{B_j}{B_a}[f(\theta)] \qquad (2)$$

and $$f(\theta) = \alpha t \qquad (3)$$

where $E_{sj}$ = the input signal to the phase sifter in the $j$th channel;
$\omega_r$ = the frequency of the reference carrier;
$t$ = time;
$A$ = a unity factor having a value of $+1$ when the target pass is in one direction and a value of $-1$ when the target pass is in the opposite direction;
$\phi_{Bj}$ = the electrical phase of the input signal to the phase shifter in the $j$th channel with reference to the phase of the signal supplied by reference carrier source 38;
$B_j$ = the length of the baseline of the interferometer which is connected to the $j$th channel;
$B_a$ = the length of the shortest unambiguous interferometer baseline;
$\theta$ = the space angle to the target measured from a vertical line perpendicular to the baseline of the interferometer connected to the $j$th channel $$\left(-\frac{\pi}{2} \leq \theta \leq \frac{\pi}{2}\right)$$

and $\alpha$ = the angular velocity of the target.

Each of channels $a$–$n$ introduces a distinct phase shift into the signal applied thereto due to the particular electronic make-up and length of the channel. Therefore, it is necessary to place respective compensating phase shifters 13–15, which may be either electro-mechanical or electronic devices, in each of channels $a$–$n$ and adjust each of these phase shifters to cancel out the distinct phase shift introduced into the signal by the channel in which the particular phase shifter is connected. Accordingly, for purposes of analysis, the phase shifter in the $j$th channel can be assumed to introduce zero phase shift into the signal applied to the $j$th channel and the output of the phase shifter $E_{pj}$ can be described as:

$$E_{pj} = \sin\left[\omega_r + A\frac{B_j}{B_a}(\alpha)\right]t \quad (4)$$

This signal is applied as the first input to the mixer and filter in the $j$th channel.

Multiplier system 35 supplies a second input to each of mixers and filters 16–18 which are in channels $a$–$n$ respectively and each of mixers and filters 16–18 mixes the inputs applied thereto and filters out the sum frequency resulting from the mixing. Multiplier system 36 preferably comprises $n$-harmonic generators with the respective harmonic generators being chosen so that the ratio of the difference frequencies at the outputs of any two of mixers and filters 16–18 is equal to the ratio of the baselines of the interferometers connected to these two mixers and filters. The fact that a harmonic generator can only produce an output frequency which is a multiple of the input frequency applied thereto necessitates the use of a frequency divider 37 between the reference carrier source 38 and the input to any harmonic generator within multiplier 35 from which it is desired to obtain a signal having a frequency other than a multiple of $\omega_r$. The frequency divider is chosen so that the desired output frequency of the harmonic generator is a multiple of the input signal applied thereto. In practice, it is convenient to choose frequency divider 37 so that the output frequencies of all of the $n$-harmonic generators of multiplier system 35 are equal to multiples of $\omega_r/X$, where $X$ = the ratio of the input frequency to divider 37 to the output frequency therefrom; however, such is not always practical as discussed more completely in NRL Report 5980, entitled Radio-Interferometer Analog Phase-Channel Combiner (MOD 11) for Unambiguous Space Angle Measurements in the Navy Space Surveillance System, by M. G. Kaufman and C. H. Weaver.

From the foregoing it can be seen that the output signal $E_{jhg}$ from the $j$th harmonic generator, which signal is coupled to the mixer and filter in the $j$th channel of combiner 11 as the second input thereto, can be described as:

$$E_{jhg} = \sin\left(1 + \frac{B_j}{XB_a}\right)\omega_r t \quad (5)$$

Since the mixer and filter in the $j$th channel of combiner 11 mixes the input signals applied thereto and filters out the sum frequency term, the output signal $E_{jf}$, from this mixer and filter is given as:

$$E_{jf} = \frac{1}{2}\cos\frac{B_j}{B_a}\left[\frac{\omega_r}{X} - A\alpha\right]t \quad (6)$$

As explained more fully in the aforementioned Patent No. 3,217,326, "0" crossing pulse generators 19–21, which are respectively in channels $a$–$n$, each produce a pulse as the signal applied thereto passes through the zero level and this pulse is applied to a respective input to "AND" gate 28. "AND" gate 28 produces an output pulse when all of its inputs are simultaneously pulsed and this pulse is applied as one input to phase meter 41. The position of the target is determined by the time displacement of the pulse applied to phase meter 41 by "AND" gate 28 from the pulse applied to phase meter 41 by "0" crossing pulse generator 42 which produces a pulse everytime the output signal from frequency divider 37 passes through the zero level.

When it is desired to check on the performance of combiner 11, the blades 25–27 of the $n$-pole, double throw switch are placed in contact with terminals 51–53 and switch blade 34 is placed in contact with terminal 54.

For purposes of ease of construction, a target pass with a constant angular velocity $\alpha$ is assumed. Part of the signal produced by reference carrier source 38, which signal has a frequency of $\omega_r$, is passed through resolver 61 which is driven by motor 62 at a rate of $AX\alpha$. The output signal $E_r$ therefrom is given by:

$$E_r = \sin(\omega_r - AX\alpha)t \quad (7)$$

Assuming that the phase shifter in the $j$th channel of combiner 11 introduces zero phase shift into this signal, which assumption is valid for the reasons stated above, the first input to the mixer and filter in the $j$th channel of combiner 11 is equal to $E_r$. The second input to the mixer and filter in the $j$th channel is the signal resulting from passing $E_r$ through frequency divider 63 and the $j$th harmonic generator of multiplier system 35.

Frequency divider 63 is chosen to provide the same divisor $X$ as frequency divider 37. Hence, the output of divider 63, $E_d$, is given by:

$$E_d = \sin\frac{(\omega_r - AX\alpha)t}{X} \quad (8)$$

Since $E_d$ is the signal applied as the input to the $j$th harmonic generator of multiplier system 35, $\alpha$ must be chosen so that $E_d$ falls within the band-pass of the $j$th harmonic generator.

The $j$th harmonic generator multiplies the input signal applied thereto by $$\left(X + \frac{B_j}{B_a}\right)$$

and, hence, the signal $E_j$, applied thereby to the second input of the mixer and filter in the $j$th channel of combiner 11 is given by:

$$E_j = \sin\left[\left(\frac{\omega_r}{X} - A\alpha\right)\left(X + \frac{B_j}{B_a}\right)\right]t \quad (9)$$

When the signals represented by Equations 7 and 9 are mixed and the sum frequency is filtered out, the output signal $E_{js}$ of the mixer and filter in the $j$th channel is given by:

$$E_{js} = \frac{1}{2}\cos\frac{B_j}{B_a}\left(\frac{\omega_r}{X} - A\alpha\right)t \quad (10)$$

Since $E_{js}$ (Equation 10) equals $E_{jf}$ (Equation 6), it can be seen that simulator 12 provides a valid simulation of a satellite pass and, therefore, a valid check on the operation of combiner 11.

The resolver 61 and motor 62 of FIG. 1 can be replaced by an electronic signal generator such as, for example, oscillator 71 of FIG. 2, it being understood that points Y and Z in FIGS. 1 and 2 identify identical points. The output signal, $E_{osc}$, of oscillator 71 is given by:

$$E_{osc} = \sin(\omega_r - AX\alpha)t \qquad (11)$$

Since Equation 11 is identical to Equation 7, the substitution of oscillator 71 for resolver 61 and motor 62 of FIG. 1 does not destroy the validity of the simulated target pass.

It should now be obvious that the present invention provides a relatively compact, fail-safe, flexible, and inexpensive simulator for a phase channel combiner.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. For use with a phase channel combiner adapted to process the output signals from $n$-radio interferometers having baselines varying in length from that necessary to obtain an unambiguous determination of the position of a target to that necessary to obtain the desired resolution of said position wherein said combiner comprises reference carrier means with an output adapted to provide a signal having a frequency $\omega_r$, a multiplier system with an input and $n$-outputs, first signal translating means adapted to provide a predetermined frequency division X and having an input coupled to said reference carrier means output and an output adapted to be coupled to said multiplier system input when said combiner is in an operational status, and $n$-channels each of which include a mixer with a first input adapted to receive the output signal from a respective one of said interferometers when said combiner is in an operational status and a second input coupled to receive a signal from a respective one of said multiplier system outputs, and a filter adapted to reject the sum frequency of the signals applied to said first and second inputs, said multiplier system being adapted to provide at each of said $n$-outputs a signal of the form $$E_{jhg} = \sin\left(1 + \frac{B_j}{XB_a}\right)\omega_r t$$

where $E_{jhg}$=the signal provided at the output of said multiplier system which is coupled to the second input of the mixer in the $j$th channel,
$B_j$=the length of the baseline of the interferometer adapted to be connected to the first input of the mixer in the $j$th channel when said combiner is in operational status,
$B_a$=the length of the shortest unambiguous interferometer baseline, and
$t$=time, and said output signals from said interferometers being of the form $$E_{sj} = \sin(\omega_r t + A\phi_{sj})$$

where $E_{sj}$=the output signal from the interferometer adapted to be connected to said first input of said mixer in said $j$th channel when said combiner is in operational status, and
$A$=a sign determining unity multiplicative factor,
$\phi_{sj}$=the phase of said output signal from said interferometer in relative to the phase of the signal provided by said reference carrier means;

a novel simulator comprising:

signal providing means having a first output adapted to be connected to the first input of each of said mixers when said combiner is in test status and a second output, said signal providing means adapted to provide at each of said first and second output signals of the form $$E = \sin(\omega_r - AX\alpha)t$$

where $E$=the signal provided at each of said first and second outputs, and
$\alpha$=an assumed angular velocity of a simulated target;

second signal translating means adapted to provide said frequency division X and having an input coupled to said second output and an output adapted to be coupled to said multiplier system input when said combiner is in test status; and switch means for coupling each of said first inputs of said mixers to respective ones of said interferometers and said multiplier system input to said first signal translating means output when said combiner is in operational status and for coupling said first inputs of said mixers to said first output and said multiplier system input to said output of said second signal translating means when said combiner is in test status.

2. The simulator of claim 1 wherein said signal providing means comprises:

a resolver having an input connected to the output of said reference carrier means; and
rotation producing means coupled to said resolver and rotating said resolver with an angular velocity of $AX\alpha$.

3. The simulator of claim 2 wherein A equals (+1).

4. The simulator of claim 2 wherein A equals (−1).

5. The simulator of claim 1 wherein said signal providing means comprises an electronic signal generator having an output frequency of $(\omega_r - AX\alpha)$.

6. The simulator of claim 5 wherein A equals (+1).

7. The simulator of claim 5 wherein A equals (−1).

References Cited

UNITED STATES PATENTS 3,217,326  11/1965  Kaufman et al. _____ 343—113

RODNEY D. BENNETT, *Primary Examiner.*

R. E. BERGER, *Assistant Examiner.*